United States Patent [19]

Saito et al.

[11] 4,410,973

[45] Oct. 18, 1983

[54] ROTARY RECORDING MEDIUM REPRODUCING APPARATUS HAVING A SWITCH MECHANISM FOR DETECTING RETURN OF A JACKET OPENING ENLARGING MECHANISM

[75] Inventors: Takashi Saito, Ayase; Takashi Kumaki, Sagamihara; Toru Kishi, Zama, all of Japan

[73] Assignee: Victor Company of Japan, Ltd., Yokohama, Japan

[21] Appl. No.: 294,801

[22] Filed: Aug. 20, 1981

[30] Foreign Application Priority Data

Aug. 20, 1980 [JP] Japan .......................... 55-117735[U]

[51] Int. Cl.³ .............................................. G11B 1/00
[52] U.S. Cl. .................................................... 369/77.2
[58] Field of Search ................. 369/77, 219, 243, 249, 369/262, 263, 270, 291, 292

[56] References Cited

U.S. PATENT DOCUMENTS 4,150,833 4/1979 Yamamura .......................... 369/219
4,196,906 4/1980 Torrington ........................... 369/77
4,352,174 9/1982 Tajima et al. ......................... 369/77

Primary Examiner—Steven L. Stephan
Attorney, Agent, or Firm—Louis Bernat

[57] ABSTRACT

An apparatus for reproducing rotary recording media has an inserting opening on its front side. A rotary recording medium is accommodated within a case having a jacket and a lid member for closing an opening of the jacket. The apparatus has a mechanism for enlarging the opening of the jacket as it is inserted into the opening. This mechanism couples with the jacket as it moves over a turntable positioned between the inserting opening and a rear part of the reproducing apparatus. A switch mechanism (comprising a microswitch) detects a movement of the jacket opening enlarging mechanism. The microswitch is positioned opposite the jacket opening enlarging mechanism and near the inserting opening. The microswitch remains operated as long as the jacket opening enlarging mechanism is moved away from the inserting opening. The microswitch returns to normal when the jacket opening enlarging mechanism moves back to its normal position near the inserting opening.

4 Claims, 6 Drawing Figures

38(39)

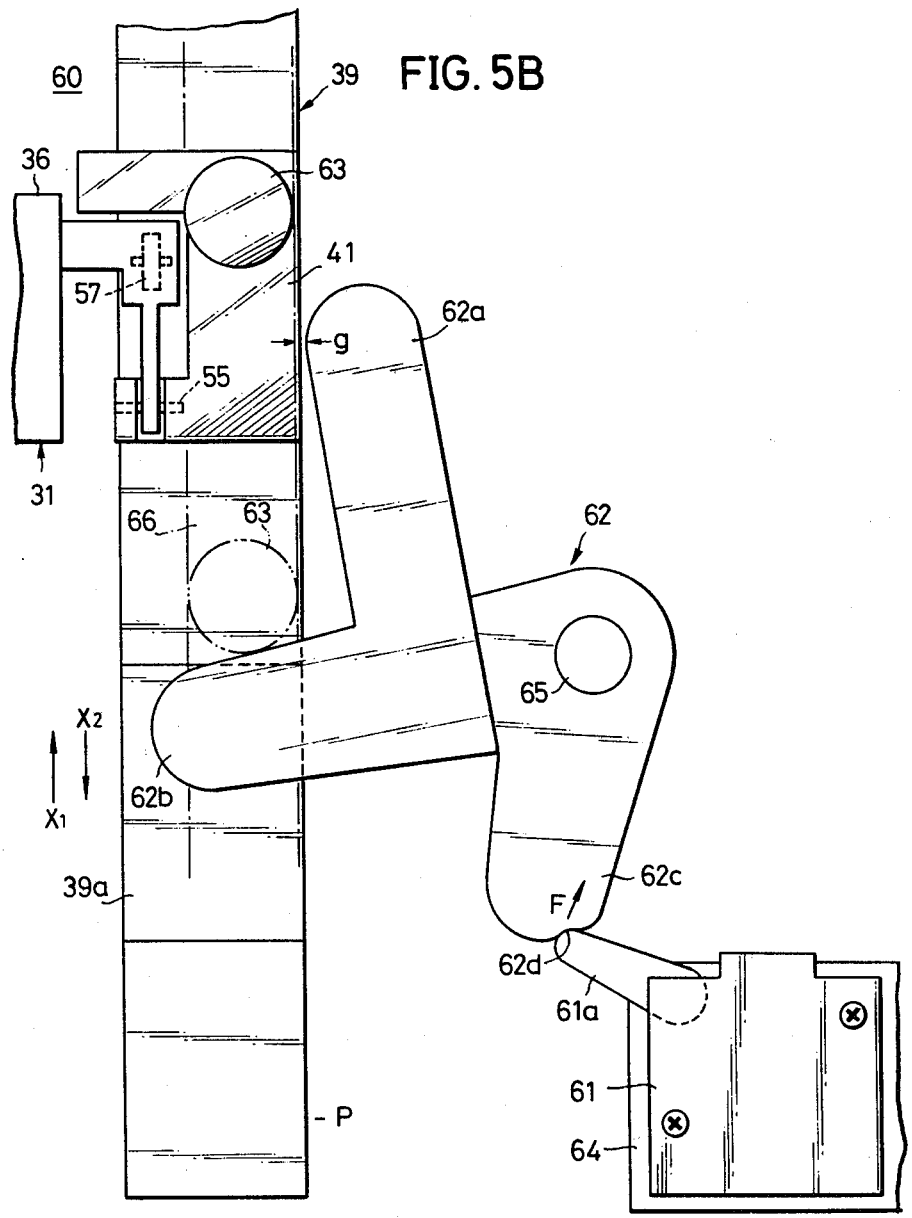

ROTARY RECORDING MEDIUM REPRODUCING APPARATUS HAVING A SWITCH MECHANISM FOR DETECTING RETURN OF A JACKET OPENING ENLARGING MECHANISM

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention relates more particularly to a rotary recording medium reproducing apparatus provided with a switch mechanism for detecting return of a jacket opening enlarging mechanism which enlarges the opening of the jacket and moves in response to the insertion and extraction of the jacket, into an original position.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc jacket (disc case) which has a lid and accommodates a disc therein, from within the reproducing apparatus.

As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, jacket opening enlarging device provided in the vicinity of the inserting opening, moving over the turntable between the position in the vicinity of said inserting opening and the innermost part of said reproducing apparatus in response to the insertion and extraction of the jacket, for enlarging the opening of the jacket by entering inside said cutouts of said lid member, upon insertion of the jacket into the reproducing apparatus through the inserting opening, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In the above type of a reproducing apparatus, the jacket opening enlarging mechanism must be positioned at a predetermined position at the inserting opening, in order to enlarge the opening of the jacket in a normal manner upon insertion of the jacket into the reproducing apparatus. Accordingly, the reproducing apparatus is provided with a detection switch mechanism for detecting the return of the jacket opening enlarging mechanism to the above predetermined position at the inserting opening. Hence, confirmation can be made on whether the above jacket opening enlarging mechanism has returned to the predetermined position in a normal manner, due to the operation of the detection switch mechanism.

The conventional detection switch mechanism is constructed so that a part of the jacket opening enlarging mechanism pushes an operation member of a switch upon final return of the jacket opening enlarging mechanism, and the switch is switched over according to this pushing action of the jacket opening enlarging mechanism. Hence, the operation of the detection switch mechanism interferes the final returning operation of the jacket opening enlarging mechanism.

On the other hand, the jacket opening enlarging mechanism moves in a state engaged with the jacket up to a position in the vicinity of the returning position, as will be described hereinafter. When the jacket opening enlarging mechanism reaches the position in the vicinity of the returning position, the engagement with respect to the jacket is released. Therefore, the final returning operation of the jacekt opening enlarging mechanism to the returning position from the above position in the vicinity of the returning position, is performed due to the action of tapered surfaces of sliders.

Accordingly, in the conventional reproducing apparatus provided with the detection switch mechanism, the final returning operation of the jacket opening enlarging mechanism is restricted at an intermediate point of the operation by the detection switch mechanism. Hence, there are cases where the jacket opening enlarging mechanism does not completely return to the returning position. When the jacket opening enlarging mechanism does not completely return to the returning position, the jacket opening enlarging mechanism is in a state where enlarging fingers for locking and pushing jacket halves so as to enlarge the opening of the jacket are mutually separated above and below each other. Thus, in some cases, the enlarging fingers do not enter within the opening of the jacket provided at the front surface of the inserted jacket, and the enlarging fingers separate from the opening of the jacket. In this case, the enlarging fingers operate in a state where the jacket halves are not locked by the enlarging fingers, and the opening of the jacket is accordingly not enlarged. That is, in the conventional reproducing apparatus, there was a disadvantage in that an accident could occur in which the opening of the jacket is not enlarged upon insertion of the jacket.

SUMMARY OF THE INVENTION

Accordingly, it is a general object of the present invention to provide a novel and useful rotary recording medium reproducing apparatus having a switch mechanism for detecting return of a jacket opening enlarging mechanism, in which the above described disadvantages have been overcome.

Another and more specific object of the present invention is to provide a rotary recording medium reproducing apparatus provided with a switch mechanism capable of detecting return of a jacket opening enlarging mechanism without interferring the returning operation of the jacket opening enlarging mechanism. According to the apparatus of the present invention, the jacket opening enlarging mechanism is positively returned to a predetermined position, and the operation to enlarge the opening of the jacket is positively performed.

Other objects and further features of the present invention will be apparent from the following detailed description when read in conjunction with the accompanying drawings.

BRIEF DESCRIPTION OF THE DRAWINGS

FIGS. 5A and 5B are enlarged plan views respectively showing states of an embodiment of a switch mechanism which forms an essential part of the rotary recording medium reproducing apparatus according to the present invention when the jacket opening enlarging mechanism is at a position at the inserting opening and when the jacket opening enlarging mechanism is at a position moved towards an innermost part of the reproducing apparatus from the position at the inserting opening.

DETAILED DESCRIPTION

Figure 1:
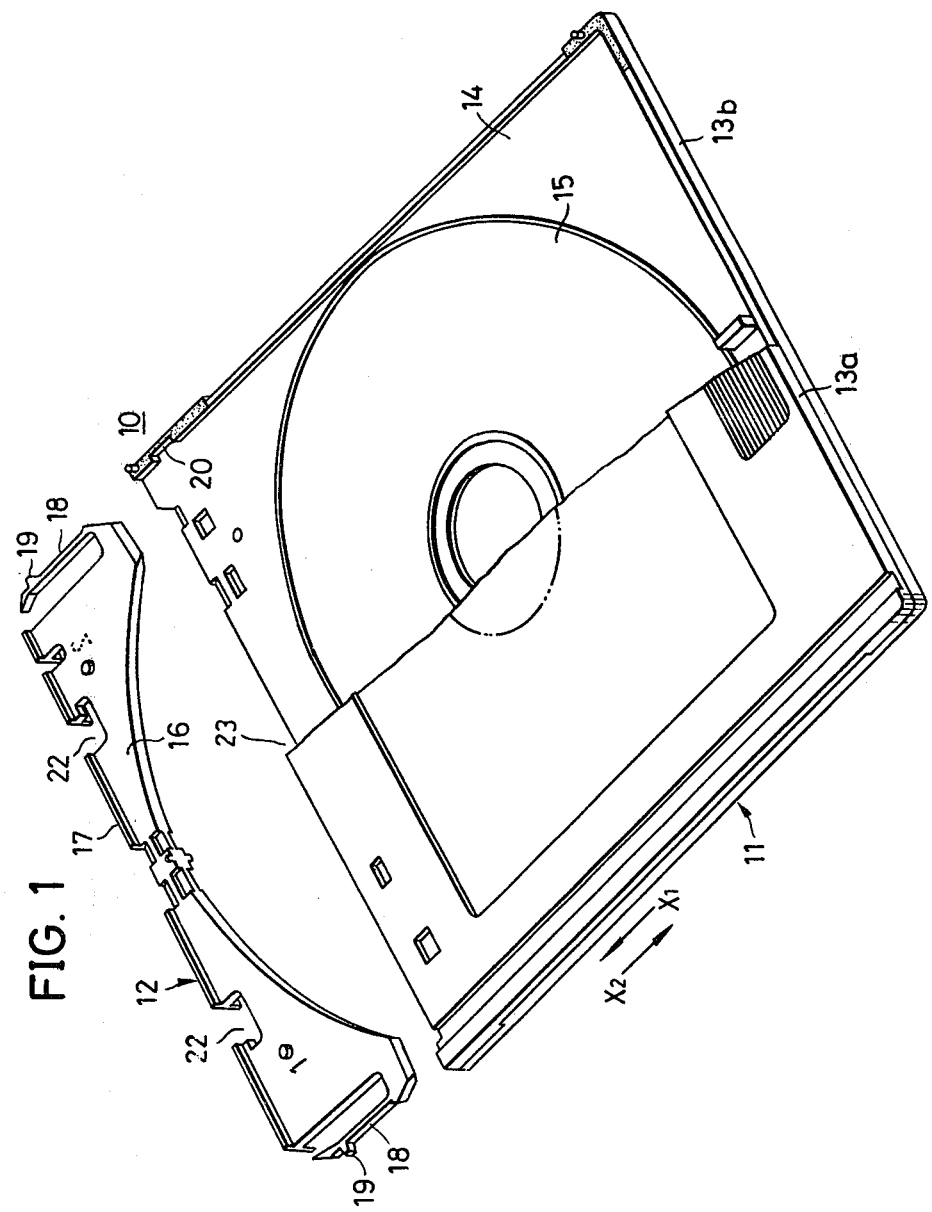
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13a and 13b, and comprises a flat cavity or space 14 therein. This space 14 is open at an opening 23 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
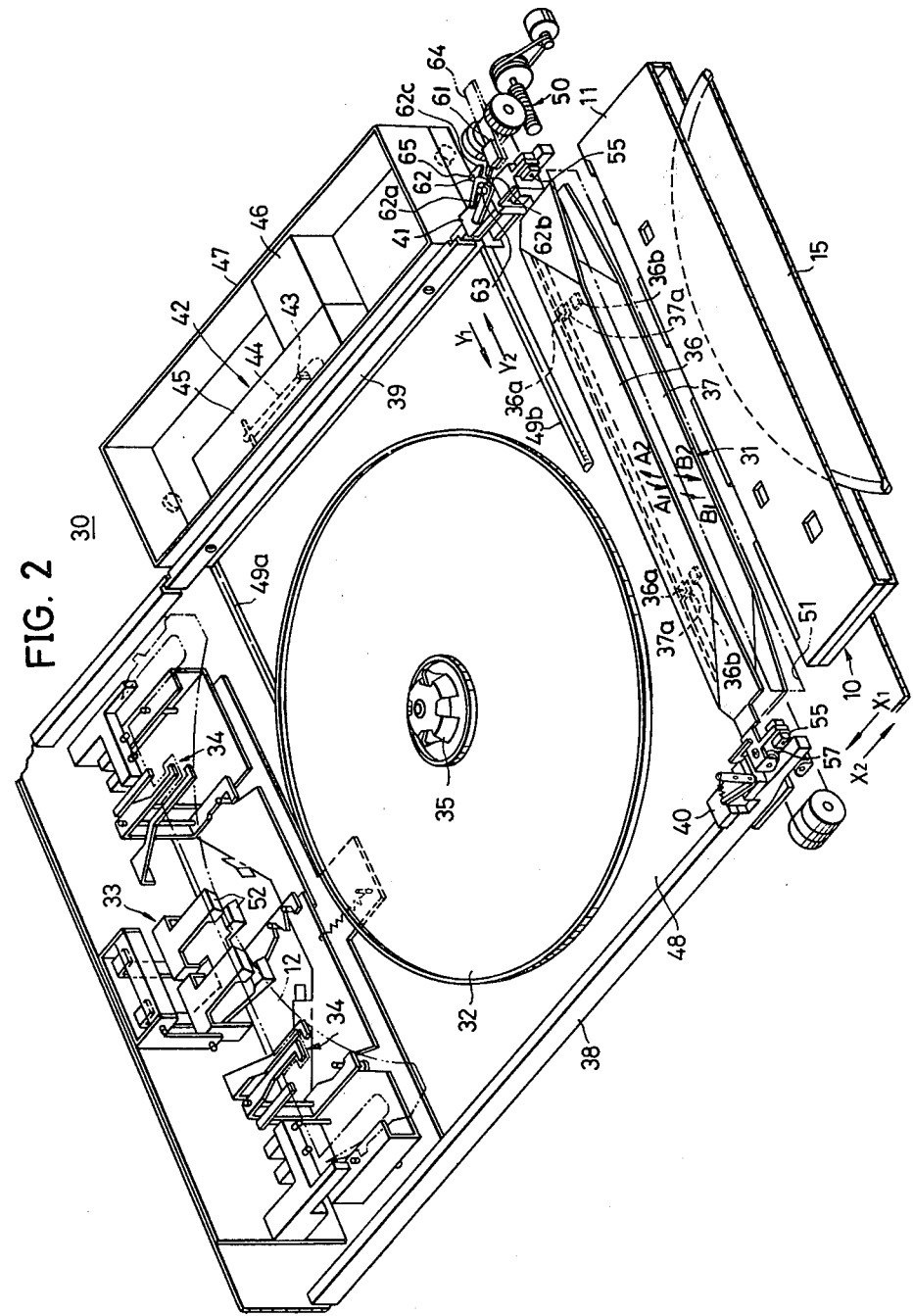
FIG. 2 is a perspective view, with a part cut away, showing the inner construction of an embodiment of a rotary recording medium reproducing apparatus according to the present invention.

As shown in FIG. 2, a reproducing apparatus 30 substantially comprises a jacket opening enlarging mechanism 31, a turntable 32 for rotating the disc 15 positioned thereon, a disc holding mechanism 33 for clamping the disc 15, a lid plate locking mechanism 34 for locking the lid plate 12, and the like.

Figure 3:
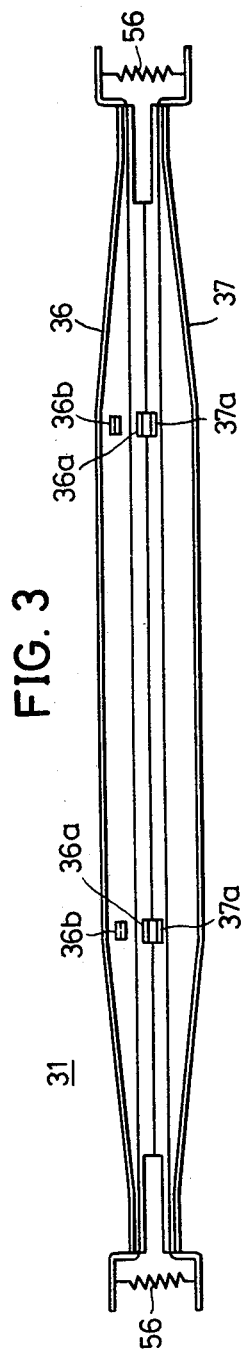
FIG. 3 is an elevation showing a jacket opening enlarging mechanism of a rotary recording medium reproducing apparatus according to the present invention.
Figure 4:
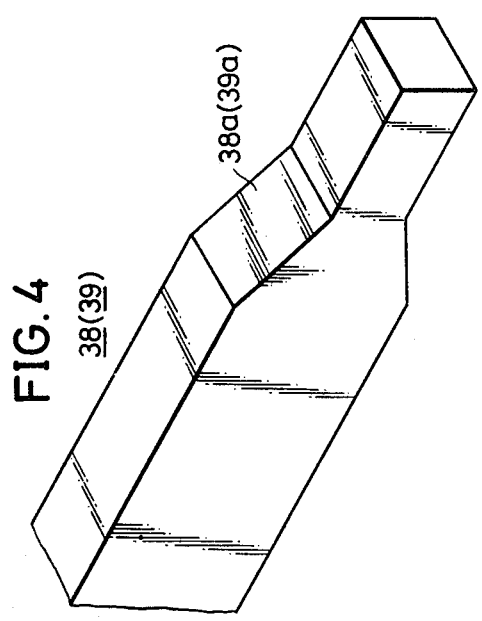
FIG. 4 is an enlarged perspective view showing a part of a guide rail on the side of an inserting opening.
Figure 5A:
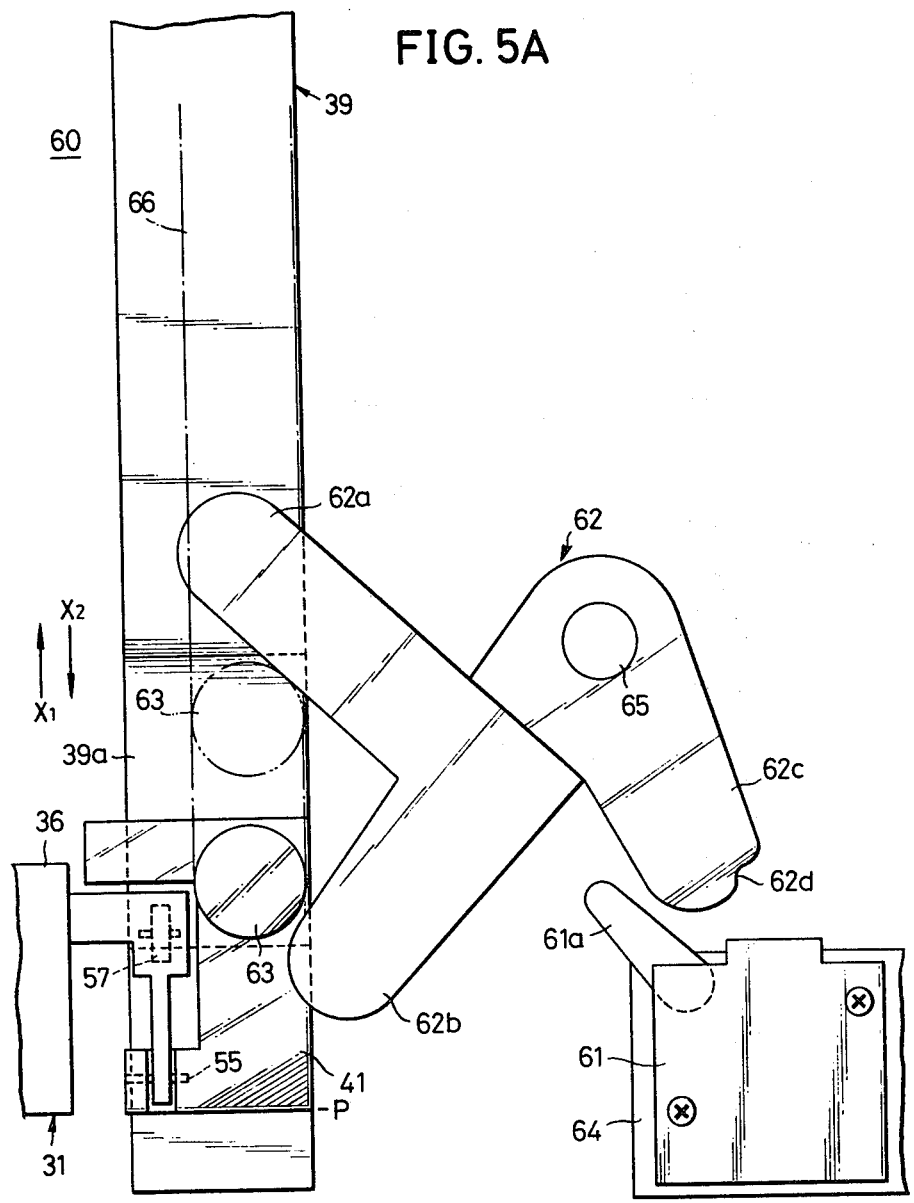

The jacket opening enlarging mechanism 31 consists of upper and lower beams 36 and 37 extending in directions of arrows Y1 and Y2, and sliders 40 and 41 fitted over guide rails 38 and 39 for supporting both ends of the above upper and lower beams 36 and 37, as shown in FIGS. 3, 5A and 5B. The upper and lower beams 36 and 37 are respectively axially supported by shafts 55. Further, springs 56 are provided in a state stretched across the upper and lower beams 36 and 37, so that upper and lower enlarging fingers 36a and 37a respectively provided on the upper and lower beams 36 and 37 are urged to rotate in directions of arrows A1 and B1, respectively, to mutually close upon each other, due to spring forces exerted by the above springs 56. The guide rail 38 (39) has a tapered part 38a (39a) at the front surface side of the reproducing apparatus 30, as shown in FIG. 4. When the jacket opening enlarging mechanism 31 is positioned in the vicinity of an inserting opening 51 of the reproducing apparatus 30, rollers 57 of the upper and lower beams 36 and 37 respective oppose narrow portions of the tapered parts 38a and 39a. Accordingly, the upper and lower beams 36 and 37 rotate in the directions of the arrows A1 and B1, and the upper and lower enlarging fingers 36a and 37a respectively close upon each other.

A reproducing transducer 42 comprises a pickup device 45 including a cantilever 44 provided with a reproducing stylus 43 a resonator 46 and the like, and is mounted to a carriage 47. The carriage 47 is transferred in the directions of the arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of the inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of an arrow X1.

When the disc case 10 is inserted into the reproducing apparatus 30 in the above described state, the jacket opening enlarging mechanism 31 is pushed and moved in the direction of the arrow X1. Hence, the rollers 57 ride over the tapered parts 38a and 39a, the upper and lower beams 36 and 37 rotate towards the direction of arrows A2 and B2, and the enlarging fingers 36a and 37a move upwards and downwards to mutually separate from each other. The enlarging fingers 36a and 37a lock the jacket halves 13a and 13b, and separate the front part of the jacket halves 13a and 13b upwards and downwards to enlarge the opening 23 of the jacket 11. Especially when the jacket half 13a is pulled upwards, engaging windows 21 engage with finger portions 36b of the upper enlarging finger 36. Accordingly, the jacket 11 and the jacket opening enlarging mechanism 31 are connected.

When the disc case 10 is inserted into the innermost part of the reproducing apparatus 30 together with the enlarging mechanism 31 through the upper side of the turntable 32, cutouts 22 of the lid plate 12 is locked by the lid plate locking mechanism 34, as indicated by a two-dot clain line in FIG. 2. Hence, the lid plate 12 is locked and held at the innermost part of the reproducing apparatus 30.

Furthermore, engagement releasing members 54 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of an arrow X2. Since the lid plate 12 and the disc 15 are respectively locked and held as described above, only the jacket 11 is moved in the direction of the arrow X2, leaving behind the lid plate 12 and the disc 15. Accompanied by this operation in which the jacket 11 is pulled out, the lid plate 12 and the disc 15 are relatively pulled out from within the jacket 11. In a state where the jacket 11 is separated from the enlarging mechanism 31 and completely pulled out from the reproducing apparatus 30, the disc 15 is supported horizontally at a position directly above the turntable 32.

When a play operation is performed, the disc 15 is lowered and placed onto the turntable 32, and is clamped by a disc clamping mechanism 35. In addition, the disc 15 is rotated towards a clockwise direction together with the turntable 32.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the disc 15 is pushed upwards. The disc 15 which is pushed up is held by the disc holding mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to a switch mechanism which forms an essential part of the apparatus according to the present invention, with reference to FIGS. 5A and 5B.

A switch mechanism 60 is provided at a position on the right side of the inserting opening 51, in a position related to the jacket opening enlarging mechanism 31, and consists of a microswitch 61, a rotary lever 62, and a locking pin 63. The microswitch 61 is fixedly screwed onto a base plate 64, and has a rotary operating member 61a. This rotary operating member 61a is urged to rotate in a clockwise direction by a spring (not shown), and the microswitch 61 is in an OFF state when the rotary operating member 61a is rotated in the clockwise direction as shown in FIG. 5A. On the other hand, the microswitch 61 is in an ON state when the rotary operating member 61a is rotated in a counter clockwise direction as shown in FIG. 5B. The above locking pin 63 is embeddedly provided on the upper surface of the slider 41.

The rotary lever 62 comprises a first arm portion 62a, a second arm portion 62b, and a third arm portion 62c, and axially supported by a shaft 65 embeddedly provided on a chassis and the like. The first and second arm portions 62a and 62b are arranged so as to substantially form a V-shape, and are at a height position opposing the locking pin 63. The third arm portion 62c is at a height position opposing the microswitch 61.

In a stage before the disc case 10 is inserted into the reproducing apparatus 30, the jacket opening enlarging mechanism 31 is at a position P at the inserting opening 51, as shown in FIGS. 2 and 5A. On the other hand, the switch mechanism 60 is in a state shown in FIG. 5A. That is, the locking pin 63 is positioned between the first and second arm portions 62a and 62b of the rotary lever 62, and the microswitch 61 is in an OFF state. The rotary lever 62 is in a freely rotatable state within a certain angular range at the position rotated in the counter clockwise direction. The first arm portion 62a is within a moving path 66 of the locking pin 63 indicated by one-dot chain lines in FIG. 5A.

When the disc case 10 is inserted into the reproducing apparatus 30, the jacket opening enlarging mechanism 31 is pushed towards the direction of the arrow X1 from the position P. As the enlarging mechanism 31 moves, the locking pin 63 reaches a position indicated by a two-dot chain line in FIG. 5A, where the locking pin 63 makes contact with the first arm portion 62a. When the enlarging mechanism 31 further moves towards the direction of the arrow X1, the locking pin 63 moves while pushing to move back the first arm portion 62a. Accordingly, the rotary lever 62 is rotated towards the clockwise direction to a position shown in FIG. 5B.

Due to the rotation of the rotary lever 62, the third arm portion 62c pushes the rotary operating member 61a to push this rotary operating member 61a towards the counter clockwise direction against a force exerted by a spring (not shown). Hence, the microswitch d61 is switched over to an ON state. A cam 62d of a step shape is provided at the tip end side of the third arm portion 62c. Therefore, the rotary lever 62 is stably maintained in the rotated position shown in FIG. 5B where the rotary operating member 61a is fitted into the cam 62d of the third arm portion 62c, due to the direction of a force F exerted by the rotary operating member 61a, the effect obtained due to the shape of the cam 61d, and force of friction introduced at the engaging part between the rotary operating member 61a and the cam 61d. Further, at this point, the second arm portion 62b of the rotary lever 62 enters within the moving path 66 of the locking pin 63. Due to the operation of the cam 62d and the rotary operating member 61a, the rotary lever 62 rotates slightly more than the amount pushed back by the locking pin 63. Hence, the first arm portion 62a completely withdraws from the moving path 66 of the locking pin 63, and a gap g is formed between the first arm portion 62a and the moving path 66.

When the jacket 11 is pulled out from the reproducing apparatus 30, the jacket opening enlarging mechanism 31 moves towards the direction of the arrow X2 in a state where the enlarging mechanism 31 is engaged with the jacket 11. The locking pin 63 moves beside the first arm portion 62a with the gap g formed therebetween, and reaches a position indicated by a two-dot chain line in FIG. 5B where the locking pin 63 makes contact with the second arm portion 62b. Thus, the second arm portion 62b is pushed by the locking pin 63, and the rotary lever 62 is rotated in the counter clockwise direction. At this point, the rollers 57 roll over the upper and lower surfaces of the guide rails 38 and 39, and the upper and lower beams 36 and 37 respectively rotate in the upward and downward directions. Therefore, the jacket 11 and the jacket opening enlarging mechanism 31 are connected at the windows 21 and the finger portions 36b.

Accordingly, the rotary lever 62 is positively rotated against a force to maintain the position of the rotary lever 62 which is introduced due to the action of the third arm portion 62c and the rotary operating member 61a. In a state where the rotary lever 61 rotates and the cam 62d of the third arm portion 62c rides over the tip end part of the rotary operating member 61a, the third arm portion 62c of the rotary lever 62 is pushed outwards due to the rotation of the rotary operating member 61a in the clockwise direction, and the rotary lever 62 is rapidly rotated towards the counter clockwise direction. Hence, the second arm portion 62b moves towards the direction of the arrow X2 with a speed greater than the moving speed of the locking pin 63 towards the direction of the arrow X2. Therefore, the second arm portion 62b separates from the locking pin 63, and the third arm portion 62c separate from the rotary operating member 61a. Thus, the rotary lever 62 is returned to the state shown in FIG. 5A where the rotary lever 62 is free with respect to the locking pin 63 and the rotary operating member 61a. Accordingly, the microswitch 61 is turned OFF, and the jacket opening enlarging mechanism 31 then moves towards the direction of the arrow X2 without pushing the second arm portion 62b of the rotary lever 62.

As the jacket opening enlarging mechanism 31 moves towards the direction of the arrow X2, the rollers 57 oppose the tapered parts 38a and 39a, and roll towards a direction so as to descend the tapered parts 38a and 39a. The upper and lower beams 36 and 37 respectively rotate in the directions of the arrows A2 and B2, and the opening 23 of the jacket 11 gradually returns to the original size from the enlarged state. Hence, the finger portions 36b slip out from the windows 21, and the connection between the jacket opening enlarging mechanism 31 and the jacket 11 is released. Accordingly, the enlarging mechanism 31 then moves towards the direction of the arrow X1, since the rollers 57 roll in directions so as to descend the tapered parts 38a and 39a due to the force exerted by the springs 56. The force with which the enlarging mechanism 31 is moved at this point is small. However, no forces are applied against the enlarging mechanism 31 to restrict the movement of the enlarging mechanism 31. Therefore, the enlarging mechanism 31 can be positively returned to the original position P.

Accordingly, in a state where the jacket 11 is pulled out from the reproducing apparatus 30, the jacket opening enlarging mechanism 31 and the switch mechanism 60 are in states shown in FIGS. 2 and 5A. That is, the enlarging mechanism 31 is returned to the original position P, and the microswitch 61 is turned OFF to detect that the above enlarging mechanism 31 has indeed returned to the original position P.

Since the enlarging mechanism 31 is returned to the original position P, the enlarging mechanism 31 is in the state shown in FIG. 3 where the upper and lower beams 36 and 37 are rotated towards the directions of the arrows A1 and B1 and the enlarging fingers 36a and 37a are moved to mutually close upon each other. Hence, when the empty jacket 11 is inserted into the reproducing apparatus 30 in order to recover the disc 15, the enlarging fingers 36a and 37a relatively and positively enter within the opening 23 of the jacket 11. Therefore, the opening 23 of the inserted empty jacket 11 is positively enlarged by the jacket opening enlarging mechanism 31.

Further, the present invention is not limited to these embodiments, but various variations and modifications may be made without departing from the scope of the present invention.

What is claimed is:

1. A reproducing apparatus for reproducing a rotary recording medium accommodated within a case, said case comprising a jacket having a space for accommodating said rotary recording medium and having an opening for enabling said rotary recording medium to go in and out of said jacket, and a lid member for closing said opening of said jacket, said rotary recording medium reproducing apparatus comprising:
   a front member having an inserting opening through which said case or said jacket is inserted;
   holding means positioned at a rear part of said reproducing apparatus and opposite said inserting opening, for holding said rotary recording medium when said case is inserted into said reproducing apparatus and then said jacket is pulled from said reproducing apparatus to leave said rotary recording medium inside said reproducing apparatus;
   turntable means positioned between said inserting opening and said rear part for rotating said rotary recording medium after it is left within said reproducing apparatus;
   a jacket opening enlarging mechanism for enlarging said opening of said inserted jacket by coupling with said jacket and moving from the vicinity of said inserting opening, over said turntable, and toward said rear part of said reproducing apparatus, responsive to the insertion of said jacket and for returning responsive to an extraction of said case or said jacket; and
   a switch mechanism for detecting a movement of said jacket opening enlarging mechanism from and to the vicinity of said inserting opening,
   said switch mechanism comprising a microswitch fixed opposite said jacket opening enlarging mechanism positioned at the vicinity of said inserting opening, and a maintaining mechanism which is pushed and operated by said jacket opening enlarging mechanism for pushing an operating member of said microswitch to operate and hold said microswitch in an activated state when said jacket opening enlarging mechanism moves away from the vicinity of said inserting opening, and for releasing said microswitch when said jacket opening enlarging mechanism moves back to the vicinity of said inserting opening so that said jacket opening enlarging mechanism completes a movement toward said inserting opening after releasing said microswitch in the activated state.

2. The reproducing apparatus as claimed in claim 1 in which said jacket opening enlarging mechanism releases the connection between said jacket opening enlarging mechanism and said jacket when said jacket opening enlarging mechanism returns to the vicinity of said inserting opening in response to the insertion and extraction of said jacket, and said switch mechanism is released from the activated state while said jacket opening enlarging mechanism is moving in a state in which it is connected to said jacket.

3. A reproducing apparatus as claimed in claim 1 in which said maintaining mechanism comprises a rotary lever member mounted at a position having a predetermined positional relationship with respect to said microswitch and said jacket opening enlarging mechanism, said rotary lever member comprising:
   a first arm portion pushed back by said jacket opening enlarging mechanism for rotating said rotary lever member in one direction when said jacket opening enlarging mechanism moves from the vicinity of said inserting opening towards said rear part of said reproducing apparatus;
   a second arm portion pushed back by said jacket opening enlarging mechanism for rotating said rotary lever member in an opposite direction when said jacket opening enlarging mechanism moves back to the vicinity of said inserting opening; and
   a third arm portion for pushing said operating member to switch over said microswitch and maintain said rotary lever member at a rotational position where said operating member is engaged with said third arm portion when said rotary lever member rotates in said one direction, and for releasing said operating member from the engagement with said third arm portion when said rotary lever member rotates towards said opposite direction.

4. A reproducing apparatus as claimed in claim 3 in which said third arm position of said rotary lever member includes a cam having a step shape with which said operating member is held.

* * * * *